Figure 1:
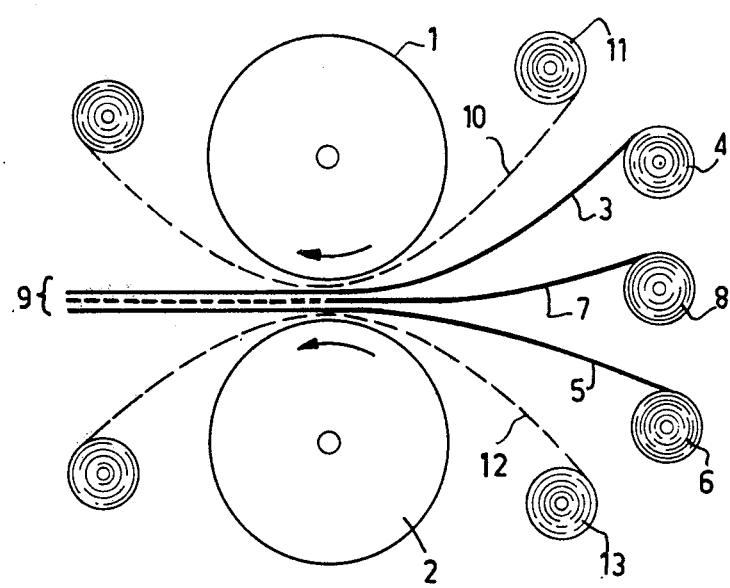

United States Patent [19]

Bouhaniche

[11] 4,326,003
[45] Apr. 20, 1982

[54] COMPOSITE PIECE MADE FROM FLEXIBLE MATERIAL AND PROCESS OF PREPARATION

[76] Inventor: Marc V. Bouhaniche, 96, rue Saint-Denis, 75001 Paris, France

[21] Appl. No.: 80,986

[22] Filed: Oct. 1, 1979

[51] Int. Cl.³ .............................................. B32B 7/14
[52] U.S. Cl. ................................... 428/198; 156/240; 156/277; 156/291; 428/202; 428/209; 428/211; 428/247; 428/253; 428/904; 428/320.4
[58] Field of Search ............... 156/291, 230, 234, 235, 156/238, 306.6, 309.6, 240, 277; 428/195, 196, 197, 198, 211, 212, 247, 224, 253, 202, 209, 316, 904; 8/471

[56] References Cited

U.S. PATENT DOCUMENTS

| | | | |
|---|---|---|---|
| 1,949,159 | 2/1934 | Glidden et al. | 428/198 |
| 2,495,761 | 1/1950 | Platt | 156/306.6 |
| 3,098,235 | 7/1963 | Gusman | 428/198 |
| 3,251,727 | 5/1966 | Reynolds et al. | 428/198 |
| 3,442,736 | 5/1969 | Duns | 428/198 |
| 3,446,658 | 5/1969 | Rose et al. | 428/198 |
| 3,530,023 | 9/1970 | Schutte et al. | 428/198 |
| 3,672,949 | 6/1972 | Brown | 428/198 |
| 3,672,950 | 6/1972 | Murphy et al. | 428/198 |
| 4,086,112 | 4/1978 | Porter | 8/471 |
| 4,101,359 | 7/1978 | Failliot | 156/277 |
| 4,161,563 | 7/1979 | Metzger | 428/354 |

Primary Examiner—James J. Bell
Attorney, Agent, or Firm—Richard L. Johnston

[57] ABSTRACT

A composite piece 9 comprises at least two layers 3,5 of flexible materials which may be identical or different. Adjacent layers 3,5 are bonded by multiplicities of interposed thermoplastic beads 7 which lie equally spaced along parallel lines and adhere to both adjacent layers. The piece 9 may be made by passing layers 3,5 and an interposed thermoplastic (preferably high-density polyethylene) lattice having the form of beads linked by thin threads through a heated calendar 1,2, whereby the threads are melted away and the beads 7 heat-welded to the layers 3,5. One or both external faces may be dyed or printed simultaneously with the head-welding step by including transfer paper(s) 11,12 in the "sandwich" passed through the calendar.

The composite pieces 9 may be applicable to e.g., furnishings and clothing, and especially to reversible garments.

8 Claims, 3 Drawing Figures

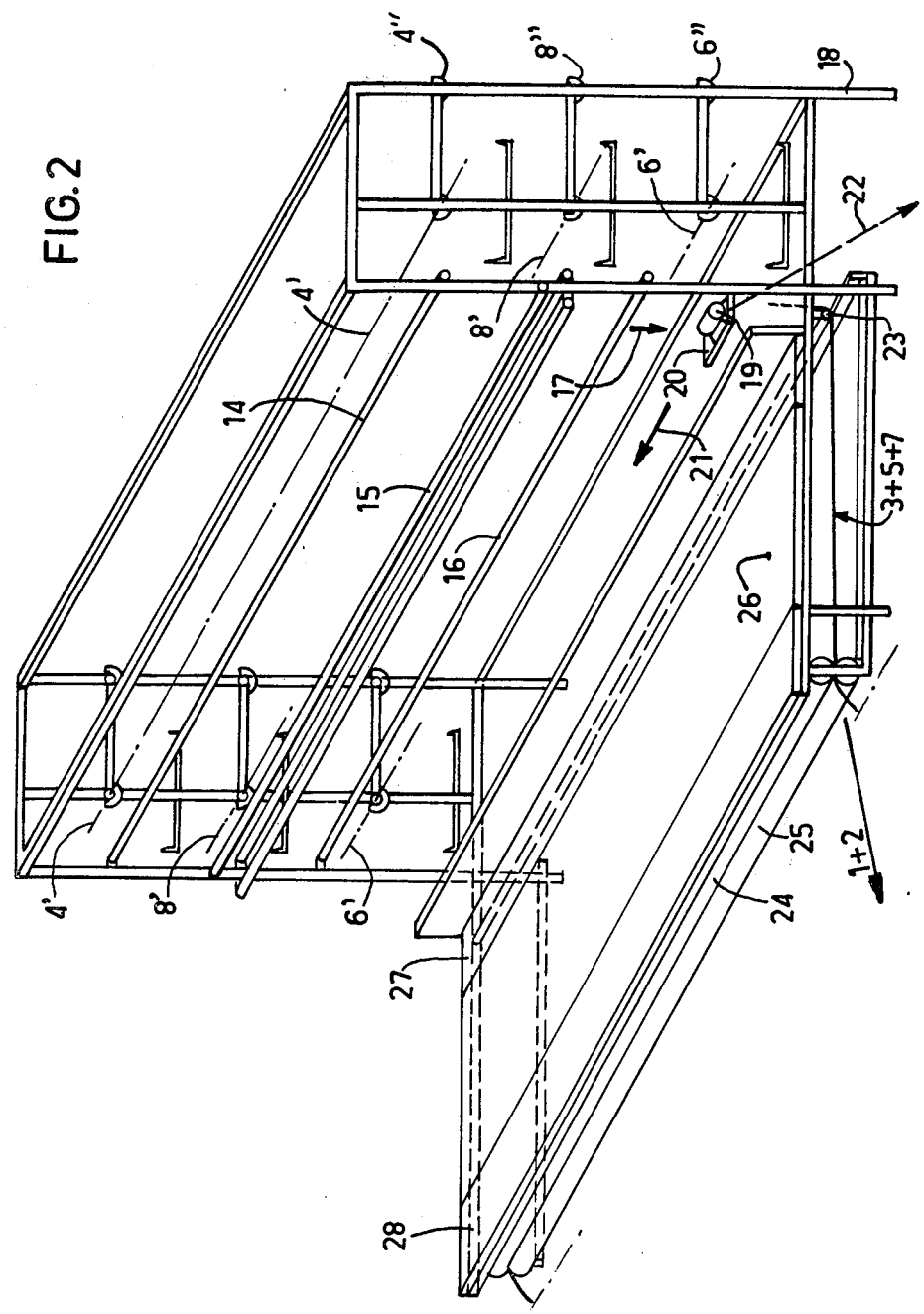

COMPOSITE PIECE MADE FROM FLEXIBLE MATERIAL AND PROCESS OF PREPARATION

The present invention relates to a composite piece made of flexible materials, which may be in the form of a strip of various widths, and to a process for its manufacture.

The term "piece" is understood in general terms as meaning a material which may be in the form of a strip of large width and small thickness and is intended, in particular, for clothing, furnishing, leather goods, footwear and decorative purposes and, in general, for all applications of textiles, leathers, plastics, rubbers, foams, metals and papers, that is to say for the applications of products capable of being converted into sheets or films. Moreover, woven, non-woven or knitted textiles are conventionally designated by this term "pieces".

Various types of composite pieces, especially of composite cloths, have already been known for a long time.

Thus, foam-back materials are produced with the aid of a thermoplastic foam laminated with a fabric under the action of heat. According to this technique, the surface layer of the foam melts and adheres to the fabric. This composite material is mainly intended for the production of car seat covers and it has very little use in the field of clothing.

Other composite cloths consist of a fabric, on one of the faces of which plastic is fixed by sticking in accordance with various processes.

For example, the fabric can be coated with a thermoplastic glue or covered with a thermoplastic film. In both cases, the composite product obtained is blocked (absence of elasticity) because of the stiffening of the face covered with plastic.

In addition, regardless of the process used for depositing the thermoplastic film, the final product obtained is impermeable and hence rather uncomfortable because it prevents the passage of perspiration.

The plastic can also be applied by sprinkling the fabric with particles of a granular thermoplastic resin. These particles are either dispersed at random or arranged at intervals which are as uniform as possible, as proposed by U.S. Pat. No. 3,098,235.

The disadvantages of this technique are obvious:

except in the case where the beads of resin are placed individually at uniform intervals, heterogeneous sticking always results, that is to say that, in certain zones, there will be a deficiency of particles, and hence a sticking defect, and, in other zones, there will be an excess of particles which will make the fabric unpleasant to the touch;

it is absolutely impossible to work continuously, with the result that this sprinkling process is absolutely unsuitable from the industrial point of view; on the contrary, sticking is only carried out piece by piece or meter by meter; and the sticking technique is absolutely incompatible with simultaneous heat-printing of the fabric.

It is also to be noted that all the processes which have just been briefly described have two major disadvantages in common: they do not guarantee either that the two welded materials will not separate or that the product will perform satisfactorily on washing above 30° C.

Furthermore, it has already been proposed, for the purpose of producing fusible linings or interlinings), to bond a special polyethylene netting to a base cloth by heating so as to break the meshes of this netting and leave spaced-out polyethylene deposits bonded to the base cloth.

The production of these fusible linings, which are intended subsequently to be stuck to a top fabric, is described in particular in British patent applications 64/46,659 and 65/8,956, in British Pat. No. 1,217,333 and in French Pat. No. 1,584,550.

The disadvantage of any composite cloth obtained by heat-sticking one of these fusible linings to a top fabric, namely a fabric which will constitute the visible part of the garment, is the relative discomfort caused by the presence of surface projections (plastic beads) at the theoretical location of the lining and hence in contact with the human body.

In addition, a heat-sticking technique of this kind absolutely rules out any concept of reversibility in the manufacture of the garments, since a light lining, through which the plastic beads will furthermore be visible by virtue of transparency, cannot form the visible face of a garment.

By means of the present invention it is possible to provide a composite piece, the two faces of which possess advantageously different characteristics (nature, structure and color) which are capable of imparting, to the finished product produced in this way, different properties depending on the face in question, and, in particular, total reversibility, which is not the case for any of the composite cloths mentioned above, nor furthermore, is it the case, at the present time, of any cloth, without detracting from the flexibility of the constituent fabrics or materials comprising the composite piece.

It is therefore an object of the invention to prepare a composite piece made of flexible materials, which is characterized in that it consists of at least two elementary layers of materials of which the nature and/or color and/or structure may or may not be identical, which layers are bonded to one another in pairs by means of a large number of thermoplastic beads which are interposed between the two layers along several parallel lines and at a constant interval from one another and adhere irreversibly to each of the two said layers.

The nature, the color and the structure of the two, three or four elementary layers forming, for example, the said composite piece of course depend on the applications envisaged and on the needs which are to be satisfied in terms of appearance and use.

In the clothing field, for example, it is possible, using the process according to the invention, to produce reversible or non-reversible garments; all of the raw materials commonly employed in the clothing industry can be used for the manufacture of the composite piece of the invention, whether this material be woven fabric (warp and weft), non-woven fabric (for example, imitation leather) or knitted fabric (mesh), velvet or imitation fur, and this can be carried out with fabrics of which the fibers are natural or synthetic or mixed.

One of the external layers of the composite piece can consist of a drapery cloth, used for the quality of its appearance, and the other external layer can be a knitted fabric, the combination retaining both good flexibility and good resistance.

The two layers can be of the same nature (e.g., two meshes or two warps and wefts), although the combination may be somewhat lacking in resistance in the first case and in flexibility in the second case.

In any case, whatever the nature and the structure of the elementary layers in question, the bond by means of plastic beads in no way detracts from the properties of flexibility, extensibility and handle of the said layers, because the total mutual independence of the beads does not cause any additional stiffness of the combination when the latter is handled, stretched or deformed.

Quite on the contrary, it is to be noted that the wear resistance of the composite piece, as well as its resistance to creases and its impermeability, may be considerably improved by the technique forming the object of the present invention.

One, two or all of the elementary layers of the composite piece may consist of a non-textile material such as a plastic foam, a plastic or metal film, leather or rubber, which may be natural or synthetic, paper, wood, fur or felt and, in general, any material in the form of a relatively deformable sheet or film.

It has been specified that the choice of the nature, of the color and of the structure of each of the layers depends on the applications envisaged.

If it is desired to obtain a composite piece which possesses, on one side, specific properties which are different from those which it is desired to have on the other side, it is very easy to choose, as the constituent materials of the two layers of the piece, those materials which seem to be most appropriate for the use envisaged.

If it is desired to produce a non-reversible garment, for example, one may utilize a drapery cloth, a gabardine, a double linen cloth, a serge or a flannel for the external layer, and a mesh for the internal layer.

On the other hand, if it is desired to make the garment reversible, two layers, which may or may not be identical, will advantageously be used, which layers have a good appearance and preferably have a different color, presentation and pattern.

However, the invention is not restricted to a composite piece with two layers, it being possible for the said piece to comprise three or more layers which are superposed and bonded to one another in pairs by means of plastic beads.

The latter are preferably uniformly distributed and their size can vary depending on the technique used for manufacturing the piece according to the invention, and also depending on the intended industrial purpose of the said piece.

Figure 3:
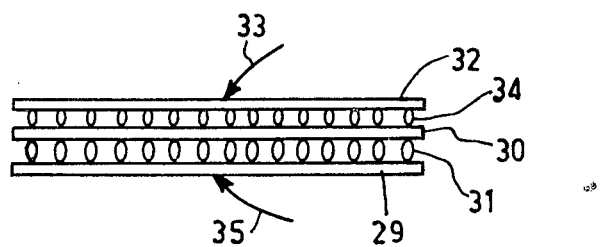

In order to provide a better understanding of the object of the present invention, a preferred process for the manufacture of a piece of this kind will be described below, by way of a non-limiting and purely illustrative example, with reference to the attached drawings in which:

FIG. 1 schematically represents a profile view of two calendering rollers which may be used to heat-weld the elementary layers and to manufacture the composite piece, with simultaneous heat-printing;

FIG. 2 is a perspective view of the devices located upstream of the calendering rollers of FIG. 1, and FIG. 3 shows a sectional view of a composite piece with three elementary layers simultaneously heat-stuck by the interposition of two nets of resin. With reference to FIG. 1, it is seen that two calendering rollers, at least one of which is a heated roller, have been designated by 1 and 2, respectively.

In the whole of the description which now follows, the word "fabric" will be used intentionally to denote each elementary layer. However, it is clear that this designation in no way restricts the invention to textiles, and that the application of the invention is consequently in no way restricted to clothing and/or furnishing; on the contrary, the invention is of wide application, as indicated in the introduction.

To manufacture a composite piece formed by joining together two fabrics, a first fabric 3 is fed from a drum 4 and a second fabric 5 is fed from a second drum 6.

A thermoplastic netting or lattice 7 is fed from a third drum 8 and the sandwich formed by this lattice 7, the latter being enclosed between the two fabrics 3 and 5, passes between the calendering rollers 1 and 2 under an appropriate pressure, at an appropriate temperature and at an appropriate speed.

The lattice 7 is preferably of the known high-density polyethylene type and is formed of beads of identical size, joined together by means of thin threads. A lattice of this kind is manufactured, for example, by Staflex International Limited and sold under the tradenames "Resins 206, 207 and 220", depending on the volume and the spacing of the beads.

Since the lattice melts above 180° C., the heating temperature provided by the calendering rollers will be of the order of 200° C.

At this temperature, the passage of the sandwich, thus formed, between the calendering rollers causes the polyethylene beads to adhere to the two adjacent fabrics and also causes the threads joining the beads to break, with the result that, on leaving the calender, the two fabrics 3 and 5 are irreversibly bonded to one another solely by means of a large number of points uniformly distributed over the whole surface of the composite piece.

This bond is therefore uniform and effective and in no way detracts from the properties of extensibility, deformability and flexibility of the combination formed. In fact, since the beads which adhere to the two fabrics have become independent of one another, it is possible, as desired, to stretch the composite piece in accordance with the inherent characteristics of its constituent layers.

More precisely, the composite piece formed in this way will essentially have the flexibility properties of the less flexible of the two constituent fabrics, it being possible for this flexibility to be modified by virtue of the possibility of using beads of thermoplastic resin of different density and different spacing.

Since the beads of resin melt at 180° C., the composite piece obtained at the outlet of the calender is resistant at least up to this temperature of 180° C., above which the layers run the risk of separating; it is therefore clear that the resistance of the said composite piece, both to the action of detergents and to that of dry-cleaning solvents, is absolutely guaranteed because washing is never carried out at this temperature.

The two substrates 3 and 5 are either already dyed or printed, or white or natural colored; in the latter case, they can be dyed or printed by the usual techniques, subsequent to calendering.

In particular, it can be of value to have available a stock of composite pieces of suitable materials, white or natural colored, which will not be dyed until the very last moment, for example, when ordered by the user.

However, advantageously, according to the invention, the external face of one or both of the fabrics 3 and 5 is heat-printed on the same calendering rollers 1 and 2 at the same time as heat-welding is taking place.

For this purpose, a transfer paper 10 is used, which is fed from a drum 11 and applied by the heated roller 1 to the external face of the upper fabric of the sandwich.

The transfer operation is carried out at about 240° C., this temperature being ideal for good sublimation. In fact, at this temperature, the coloring pigments deposited on the transfer paper 10 vaporize and dye the fiber of the fabric 3 according to the pattern drawn on the transfer paper.

Furthermore, although the resin is destroyed at about 220° C., the transfer temperature provided by the calendering rollers does not affect the said resin because, if the temperature of the sandwich is 240° C. on the outside, its temperature at the center is about 30° C. lower, that is to say that the said temperature at the center remains satisfactory in order to guarantee perfect and irreversible adhesion.

Since the transfer papers have an unlimited range of colors and patterns, there is an infinite number of possible ways of coordinating the colors or prints on one of the fabrics 3 with those on the other fabric 5, especially in the case of the production of a composite piece for clothing (matching the lining with the top fabric or any combination of colors and/or prints for the purpose of reversibility).

It is also possible, according to the invention, to heat-print the two external faces of the composite piece 9 with the aid of a second transfer paper 12 fed from a fifth drum 13. To do this, in the case where only one roller in two is a heated roller, either the piece is passed twice through the same calender or it is passed only once through a calender comprising two pairs of two rollers arranged in series; in the case of a calender of which both rollers were heated rollers, a single passage would then suffice to heat-print both the external faces of the piece, at the same time as carrying out the heat-welding operations.

In FIG. 2 there have been represented as examples, devices which precede the calender.

On shaft 4' there will be placed drum 4 containing top material to be printed, a stretchable knit, for example, said cloth material necessarily unwinding without tension to avoid deformation and shrinkage in the width.

Shaft 8' is meant to receive drum 8 for the netting while shaft 6' is meant to receive drum 6 on which the under-fabric is wound, a stretchable warp-weft type fabric, for example, the unwinding of which also must be tension-free.

The supports 4", 8" and 6" make it possible to place back-up webs for the working webs. When a web runs out, it consequently suffices to unwind a few meters into the winding-off bowls, so as to recover the show-end of the said web, in order to sew it to the leading end of the back-up web.

The fabrics 3 and 5 and the netting 7, and also the three webs intended to replace them, will be perfectly aligned on the right hand side. When the first three fabrics are engaged by the unwinding rollers 14, 15 and 16, in the plane of circulation 17, the left hand selvedges run the risk of not being perfectly aligned.

On the left hand side of the tubular frame 18, which supports all the drums, there are therefor electrical scissors 19, which are mounted on a fixed table 20 and are free to move in a slide, in the direction 21, as a function of the width which it is desired to obtain.

At the present time, experiments have been carried out with widths of up to four meters.

The waste fabric cut off by the scissors 19 is conveyed in a slide, represented schematically by the line 22, under the action of a compressed air jet directed onto the side of the cutting blade so as to continuously keep the scissors free.

The three fabrics are attached to the show-end of a fourth web, referred to as an engaging web, which makes it possible to bring this assembly from the lower unwinding roller 23 to the two rubberised drive rollers 24 and 25, underneath the service table 26 in which the two tilting parts are provided, namely a rear part 27 and a front part 28, respectively, in order to permit the positioning and the engaging of the fabric between the rollers 24 and 25.

These two rubberised rollers are provided with a variable drive which makes it possible to feed the fabrics into the calender without any tension. Moreover, a loop for relaxing the fabrics, which is provided before the inlet of the calender, eliminates any risk of tension and guarantees the quality of the cross fabric.

This variable drive is operated, for example, by an individual motor equipped with a reducing gear and a variable transmission, making it possible to deviate by 10% above or below the mean speed. Since the mean unwinding speed of the fabrics is 200 meters per hour, they can thus be driven at between 180 and 220 meters per hour.

The drive is preferably directly coupled to the lower roller, the upper roller simply being placed between slides and driven by means of a pinion from the lower roller. This construction makes it possible to raise the upper roller at the moment when the fabrics are engaged, that is to say at a moment when it is necessary to insure their alignment. It then suffices to bring the upper roller down onto the lower roller in order to allow a sufficient grip to carry the fabrics through.

The assembly delivered by the two rollers is fed between the rollers 1 and 2 of the calender. One or two transfer papers may be associated with the latter rollers in an alignment which will insure perfect printing.

After the outlet belt of the calender, at the end of the run, two perforated tubes are placed between the end of this belt and the take-up and conditioning roller, which tubes can project a cold air jet under the composite piece in order to solidify the resin and thus perfectly to stabilize the said piece.

In addition, one or more further tubes, projecting a steam jet onto and/or under the piece in order to remoisten the fabrics which have been almost totally dehydrated during the heat-welding operation, are provided.

This re-hydration is particularly important for fabrics totally or partially comprising natural material (especially wool and cotton) in order to re-impart the best possible flexibility.

Examples of applications of the invention which may be mentioned are, first and foremost, the production of a composite piece, intended for clothing, for the production of a reversible garment, either in the same shade or contrasted; or of a non-reversible garment, either in the same shade or contrasted. In this respect, it is noted that there are four possible applications in garment manufacturing terms.

It is also recalled that, as presently defined, the articles of clothing intended to be worn as topwear and outer wear are manufactured from three basic elements, namely:

(a) the top fabric, which determines the external appearance of the article, (b) the interlinings, which may be heat-stuck or conventional, and various fronts or bodying layers, which provide the stiffness and resistance of the fabric in accordance with the fashion trends and the structure of the materials, and (c) the lining, which hides the various cloth joins and determines the inner appearance of the garment.

The present invention makes it possible to produce, in a single operation, a product which combines these three base elements, because, in fact, a first fabric 3, for example a warp and weft fabric, combined with a second fabric 5, for example a woven fabric, by the resin 7 corresponds in reality to the top fabric already interlined by the resin and already lined by the second fabric.

If the second fabric is printed and is of a satisfactory quality for it to be worn indiscriminately on the outside or on the inside of the garment, the process for the production of a reversible garment is immediately understood. In this case, in the zones of the garment which are to be turned down, the composite piece will be reversed so that it is always the same material which can be seen on the body and on the turned-down parts.

Whether or not the garment is reversible, the advantage of this concept of a single and compact material which integrates at the levels the criteria of appearance and use of the three conventional elements (fabric, interlining and lining) is that, in operations suesequent to the manufacture of the composite piece, a considerable amount of time is saved in the manufacture of the garment because there only remains to join together, in an appropriate manner, the various fabric parts which make up the garment.

With reference to a customary manufacturing sequence for a jacket or coat, this new concept of a composite material makes it possible to reduce the manufacturing time in a ratio of 1 to 8, either by making it possible totally to eliminate certain operations (padding the cloths and the linings, aligning the cloths and the linings and joining up the pieces of lining), or by making it possible to combine other operations (cutting out on a pattern, pattern designing, tracing and cutting), which are now carried out in a single step, and not separately, for the cloths on the one hand and the linings on the other hand.

By virtue of the elimination or combining of some of the above mentioned operations, the manufacturing time of a jacket is reduced from four hours to thirty minutes.

A further example of an application of the invention which may be mentioned is the production of a composite cloth which is intended, in particular, for making seat covers and is manufactured from a layer 5 of plastic foam, a netting 7 of thermoplastic resin, a fabric 3 and a transfer paper 10 applied to this fabric.

A non-reversible composite cloth is thus produced.

According to a further embodiment of a non-reversible composite cloth, as represented schematically in FIG. 3, the said cloth is produced from a lining 29 which is bonded to a thin foam padding 30 by means of a first netting 31 of thermoplastic resin, the foam padding being bonded to the top fabric 32, which is to be heat-printed simultaneously as indicated by the arrow 33, by means of a second thermoplastic netting 34. To make this cloth reversible, it suffices to apply another transfer paper to the lining 29, as indicated by the arrow 35.

Of course, countless other combinations can be envisaged, depending on the numerous possible applications, such as clothing, knitwear, furnishings, decorative purposes, leather goods, footwear, floor coverings and wall coverings, the leather industry, the fur industry and the paper and cardboard industry, all these applications being furthermore envisaged with or without reversibility.

The invention is hereby claimed as follows:

1. Composite piece made of flexible materials, comprising at least two elementary layers of materials of which the nature and/or color and/or structure may or may not be identical, adjacent layers being bonded to one another by means of a large number of thermoplastic beads which are interposed between the two layers along several parallel lines and at a constant interval from one another and adhere irreversibly to each of the two said layers, said thermoplastic beads melting at a temperature of at least 180° C. and the two elementary layers being bonded together and printed on one or both faces from print transfer paper simultaneously in a single operation by heating the print transfer paper to a temperature of at least 200° C. sufficient to heat-print the outer face or faces and simultaneously heat-weld the two elementary layers together, the heat-printing being carried out at a higher temperature sufficient to vaporize coloring pigments in the print transfer paper and deposit them on the outer face or faces of the elementary layers, said higher temperature being selected so that the heat-weld temperature is lower but sufficient to heat-weld the elementary layers.

2. Composite piece according to claim 1, characterized in that the thermoplastic beads are made of polyethylene, preferably high-density polyethylene.

3. Composite piece according to either one of claims 1 or 2, characterized in that at least one of its two external faces is printed at a temperature of about 240° C.

4. Composite piece according to claim 1, characterized in that the elementary layers are made of textile material, which may be natural or synthetic or mixed, and which may be in the form of woven fabric, knitted fabric or non-woven fabric.

5. Composite piece according to Claim 1, characterized in that at least one of the said elementary layers consists of one of the group of materials capable of being supplied in the form of a sheet or film, which group comprises: plastic foam, natural or synthetic rubber, natural or synthetic leather, metal, paper and wood, and in general, any relatively deformable material which can easily be provided in the form of a sheet or film.

6. Process for the manufacture of a composite piece according to claim 1, characterized in that it consists in passing, between calendering rollers, at a defined speed, under a defined pressure and at a defined calendering temperature, a sandwich of at least two elementary layers of suitable materials, between which a thermoplastic net or lattice is inserted so as to cause the said layers to adhere by means of discrete beads and to break up the fine bonds which existed between the adjacent beads, said thermoplastic having a melting temperature of at least 180° C. and the two elementary layers being bonded together and printed on one or both faces from a print transfer paper simultaneously in a single operation by heating the print transfer paper to a temperature of at least 200° C. sufficient to heat-print the outer face or faces and simultaneously heat-weld the two elementary layers together, the heat-printing being carried out at a higher temperature sufficient to vaporize coloring pigments in the print transfer paper and deposit them on the outer face or faces of the elementary layers, said higher temperature being selected so that the heat-weld temperature is lower but sufficient to heat-weld the elementary layers.

7. A process as claimed in claim 6 in which the heat-printing temperature is about 240° C.

8. A composite piece as claimed in claim 1 in which said flexible material comprises velvet.

* * * * *

UNITED STATES PATENT AND TRADEMARK OFFICE
CERTIFICATE OF CORRECTION

PATENT NO. : 4,326,003

DATED : April 20, 1982

INVENTOR(S) : MARC V. BOUHANICHE

It is certified that error appears in the above-identified patent and that said Letters Patent are hereby corrected as shown below:

On the title page add:

[30]	Foreign Application Priority Data

Oct. 5, 1978 [FR] France ........................78 28537

Signed and Sealed this

Fifteenth Day of June 1982

[SEAL]

*Attest:*

GERALD J. MOSSINGHOFF

*Attesting Officer*	*Commissioner of Patents and Trademarks*